(12) United States Patent
Tuomela et al.

(10) Patent No.: US 7,463,882 B2
(45) Date of Patent: Dec. 9, 2008

(54) METHOD FOR REDIRECTING CONTACTS AND SETTING UP REDIRECTION

(75) Inventors: Frans Tuomela, Helsinki (FI); Kai Väänänen, Espoo (FI)

(73) Assignee: Data Advisors LLC, Las Vegas, NV (US)

( * ) Notice: Subject to any disclaimer, the term of this patent is extended or adjusted under 35 U.S.C. 154(b) by 11 days.

(21) Appl. No.: 10/645,208

(22) Filed: Aug. 21, 2003

(65) Prior Publication Data

US 2004/0043776 A1   Mar. 4, 2004

(30) Foreign Application Priority Data

Aug. 28, 2002   (FI) ................. 20021541

(51) Int. Cl.
    H04M 3/42    (2006.01)
    H04M 3/493   (2006.01)
    H04Q 7/20    (2006.01)

(52) U.S. Cl. ............... 455/417; 455/414.1; 455/445; 455/41.2; 455/431; 455/456.4

(58) Field of Classification Search ........... 455/445, 455/41.2, 414.1, 417, 431, 456.4
    See application file for complete search history.

(56) References Cited

U.S. PATENT DOCUMENTS

| | | | |
|---|---|---|---|
| 5,903,833 A * | 5/1999 | Jonsson et al. ......... 455/417 |
| 5,970,388 A * | 10/1999 | Will ................... 340/7.29 |
| 6,038,451 A | 3/2000 | Syed et al. |
| 6,058,415 A * | 5/2000 | Polcyn ................. 709/200 |
| 6,091,948 A * | 7/2000 | Carr et al. ............ 455/414.1 |
| 6,321,084 B1 * | 11/2001 | Horrer ................. 455/431 |
| 6,501,838 B2 * | 12/2002 | Brachman et al. ....... 379/211.02 |
| 6,584,188 B2 * | 6/2003 | Kim ................... 379/211.02 |
| 6,590,969 B1 * | 7/2003 | Peters et al. .......... 379/211.02 |
| 7,031,698 B1 * | 4/2006 | Appelman .............. 455/417 |
| 2002/0102974 A1 * | 8/2002 | Raith ................. 455/434 |
| 2002/0115471 A1 * | 8/2002 | De Loye et al. ........ 455/552 |
| 2002/0137498 A1 * | 9/2002 | Goss et al. ........... 455/417 |
| 2003/0092451 A1 * | 5/2003 | Holloway et al. ....... 455/445 |
| 2003/0140145 A1 * | 7/2003 | Lindberg et al. ....... 709/227 |
| 2003/0161452 A1 * | 8/2003 | Fournier et al. ....... 379/88.22 |
| 2004/0102188 A1 * | 5/2004 | Boyer et al. .......... 455/422.1 |

FOREIGN PATENT DOCUMENTS

| WO | WO 98/26621 | 6/1998 |
|---|---|---|
| WO | WO 99/01004 | 1/1999 |
| WO | WO 01/80449 | 10/2001 |

* cited by examiner

Primary Examiner—Vincent P. Harper
Assistant Examiner—Marisol Figueroa
(74) Attorney, Agent, or Firm—Foley & Lardner LLP

(57) ABSTRACT

A method for setting up redirection of contacts coming to a terminal (A) to at least one other communication system (A'), which is advantageously located outside the mobile communication network so that a proposal of and address of a other communication system (A') is sent by utilizing the data transmission connection set up between the terminal (A) and the first communication system (S) to the terminal (A), whose acceptance of the proposal is followed by the activation of the redirection.

15 Claims, 3 Drawing Sheets

METHOD FOR REDIRECTING CONTACTS AND SETTING UP REDIRECTION

TECHNICAL FIELD

The present invention relates to a method for setting up redirection of contacts between a terminal and at least one communication system. In addition, the invention relates to a method for redirecting a contact to said communication system. In addition, the invention relates to a system, which comprises a first and a second terminal, a first communication system and at least one other communication system that the contact is redirected to.

BACKGROUND OF THE INVENTION

When the geographic coverage area of a mobile communication network is wide, there are still areas that remain outside the coverage area and for which it is not viable or even possible to build a base network or the usage of a network is not permitted, for example, for safety reasons. However, even in these areas the reachability of people becomes important. Reachability can mean setting up a conventional phone call, but increasingly it also means setting up other types of contacts, such as video conferences, text-based conversations etc. either individually or connected together.

Redirecting calls (call forward) within a mobile communication network (GSM/GPRS) or between a mobile communication network and a public switched telephone network (PSTN) is generally known. When the user wants to direct calls to another number, he/she must activate call forwarding on his/her phone. In call forwarding, a new target number where the calls are redirected to is determined. The phone number can be another mobile phone number, a number of a telephone network or the number of a switch center. The new target address is updated in the Home Location Register (HLR) in the mobile communication network, after which the routing to the new number can be done. Call forwarding can be performed only to individual voice, data and fax calls. Thus forwarding different message types is not necessarily discussed and, for example, forwarding short messages is not possible. The solutions also do not discuss how the contacts are switched to systems outside the coverage area (of the public switched telephone network or the mobile communication network) and to numbers which are not known by the user setting up the call forwarding. In other words, in solutions according to prior art, setting up call forwarding and determining the target numbers is the responsibility of the user.

For example, there are ships, airplanes and mines located outside the coverage area of a mobile communication network. In airplanes the usage of mobile phones is not permitted for safety reasons, unlike in ships, wherefrom there is no connection to base stations on open seas. Both, however, have passengers, for whom it may be important to be within reach also during the journey. In setting up the redirection the problem is the addresses/numbers of the terminals used in the ship (for example satellite phones), which should be known in advance (prior to leaving the coverage area) in order to set up redirection. Publication WO 0180449 A1 describes one way of setting up an interface between a satellite phone used in an airplane and a mobile phone. A user's identifier card (for example, the SIM card of a mobile phone or other suitable type for satellite phones) is placed in a reader in a satellite phone, after which a connection between the identifier system of the card of the satellite ground station and the mobile communication network of the card holder. In the mobile communication network there is a unit, with which it is possible to return the information that the terminal of the user is roaming in the home network, but at that particular moment "busy" to the mobile communication network. The identifier card in the reader of the satellite phone changes the user's existing call forwarding settings in such a manner that the phone call that was made is routed to a new number when the mobile communication network receives a BUSY-message from said unit. Card readers are required in the terminals used in the system according to the publication, in which case all communication systems cannot automatically function as targets for redirection.

As the mobile communication systems develop, contacts comprise more and more multimedia, in which case the problem is the redirection of contacts between two different communication systems. The solutions according to prior art do not discuss what information the network-terminal combination of the user is offering at a certain moment, i.e. how the direction of contacts according to the network and terminal is usually handled, as well as whether the call forwarding between the desired systems is even possible.

SUMMARY OF THE INVENTION

The purpose of the present invention is to make setting up redirection easier, in which case the user does not have to be aware of the new target number, but a proposal of possible call forwarding targets is presented to the user. In addition, a purpose of the invention is to make it possible to receive contacts in such a terminal, which is the most advantageous for the contact in question and/or which is not possible to register into the system of the operator or which is outside the coverage area of a mobile communication network.

The present invention is based on the idea that setting up redirection is automatic as a result of accepting a proposal received via the data network. In addition, the invention relates to directing different contacts to a more advantageous terminal according to specific parameters.

To put it more precisely, the method according to the present invention is primarily characterized in that a proposal of an address of a second data system is transmitted by utilizing the data transmission connection set up between a terminal and a first communication system to the terminal to be accepted and/or to activate redirection. In addition, the method for redirecting connections to the communication system according to the present invention is primarily characterized in that a contact to a second communication system is directed according to a parameter. In addition, the system according to the invention is primarily characterized in that the terminal and the first communication system comprise a data transmission connection between them to transmit the address of the communication system as a proposal to the terminal, which comprises means for accepting the proposal and/or for setting up redirection.

The present invention improves the prior art in redirecting contacts in such a manner, that the user can direct the contacts coming to his/her mobile phone to, for example, systems outside the mobile communication network, such as to satellite phones or to an e-mail of a home computer. In addition, redirection makes it possible to sift contacts, in which case the different types of messages can be directed to different target addresses, for example phone calls are received in an airplane, but text-based messages are directed to an e-mail and faxes to the office. In addition, in the method setting up redirection is automatic, unlike in the redirection according to prior art, in which the transmission is activated by the customer. The user does not need to provide or even know the target address, but the network handles the setup automatically. In addition, the method according to the invention makes it possible to switch information connected to the transmission of the contact, such as the reason for the transmission, the duration or the target address.

BRIEF DESCRIPTION OF THE DRAWINGS

In the following, the present invention for automatic redirection of contacts will be described in more detail with reference to the appended drawings, in which.

DETAILED DESCRIPTION OF THE PREFERRED EMBODIMENTS

Figure 1:
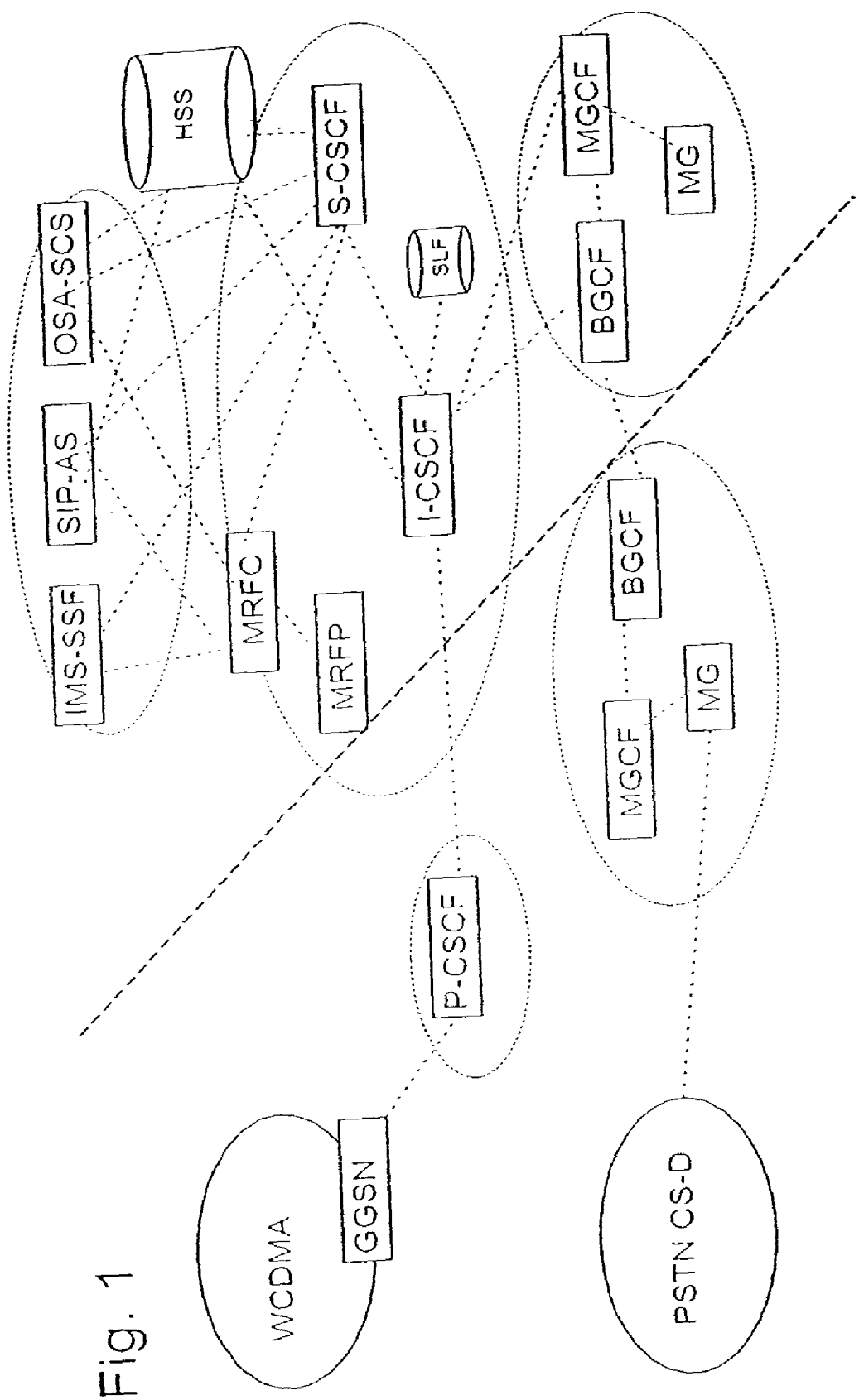
FIG. 1 presents the basic architecture of the IMS platform.

The method according to the invention functions in an IP-based multimedia system (IMS, IP Multimedia Subsystem), whose basic architecture is presented in FIG. 1. The IMS is a platform developed for multimedia services, which makes it possible to uniformly process different forms of data, as well as data transmission between different networks (for example mobile communication network vs. the Internet). The contact setup is based on SIP protocol (Session Initiation Protocol), which is a protocol developed for a packet-switched IP-network (Internet Protocol), and by means of which it is possible to set up an interactive and real-time connection between users. SIP protocol is used in communication between two different and/or similar terminals, which can include multimedia elements, such as video, text based message transmission, games, etc. SIP-URLs are used in transmitting contacts.

The IMS is based on home and visiting network architecture. In this type of architecture the term home network refers to a network wherein the data and services of the user are located. The visiting network, for its part, makes mobility and connections possible. In other words, the main task of a visiting network is to offer the subscriber a mobile connection to his/her home network. As a result of this, subscribers are continuously in a visiting network, but the service in handled via their home network. The home network is outlined in FIG. 1 on the right side of the dashed line.

The IMS comprises service, control and combination levels. On the service level, the IMS-SSF (Service Switching Function), the SIP-AS (Application Server) and the OSA-SCS (Open Service Architecture) handle the services, their usage and their access.

On the control level, the IMS is formed around Call/Session Control Functions (CSCF), which include I-CSCF, P-CSCF and S-CSCF. The proxy server P-CSCF (Proxy-CSCF) is in the visiting network and controls the messages between the mobile communication device and the home network. The device of a customer visiting in a mobile network environment always sends its SIP message via the P-CSCF, which, in practice, functions like an ordinary SIP proxy server. The P-CSCF directs the SIP message from the device to the SIP server in the home network (and vice versa). The P-CSCF can also edit or compress the outgoing request. The I-CSCF (Interrogating-CSCF) is in the home network and sets up an access to the home network, at the same time hiding the inner structure of the home network from other networks. All the sessions addressed to the home network subscriber are first received in the I-CSCF, which directs the requests to the data controller (S-CSCF, Serving-CSCF). The S-CSCF performs session control services to the user device. The S-CSCF is always located in the user's home network and thus the user is always contacted via the home network, i.e. mobility is controlled in a similar manner as in, for example, a GSM network. User registration and identifying registered users takes place in the S-CSCF, which also handles the session control on behalf of the registered users. The S-CSCF is in contact with the subscribed services of the service base and by means of this sets up grounds for invoicing. It also determines which application server receives the incoming SIP session request in order to ensure an appropriate service processing. This conclusion is made on the basis of information received from the home server (HSS, Home Subscriber Server).

The HSS developed from the home location register (HLR) and authentication center (AUC) controls the subscriber profile of the user and is aware of which core network node the user is in at a certain time. It also supports authentication and authorization (AAA) of the subscriber. In addition, the HSS comprises information on the subscribed services and applications and application servers (SIP-AS). In networks, wherein there are several HSSs, a database (SLF, Subscriber Location Function) is used to offer information on the HSS, which includes the desired profile of the subscriber. The media resource function (MRF) includes the functions for handling multimedia flows, for multimedia services functioning between several subscribers, for showing multimedia messages, as well as for media conversion. MRF is divided into a control part (MRFC, Controlling) and a processing part (MRFP, Processing).

Between the mobile network (for example WCDMA, GPRS) and the home network functions a Gateway GPRS Support Node (GGSN), which is the interface of the mobile network to other public data networks. The GGSN modifies the data packets of the mobile network to a form used by the outside network, in other words, forms an IP address visible to the outside for the packet, on the basis of which the packet can be normally routed outwards from the GGSN.

Connection functions (bearer) must be performed between a home network and conventional networks (PSTN, Public Switched Telephone Network). The IMS uses a media gateway (MG) as an interface to the public telephone network. A BGCF function (Breakout Gateway Control Function) selects a MGCF function (Media Gateway Control Function) equipped with a media gateway (MG) in order to connect the home network (interworking). The MGCF offers a connection between the SIP session control signaling of the IMS and the outer GSTN network (general switched telephone network) of ISUP/BICC request control signaling.

Figure 2:
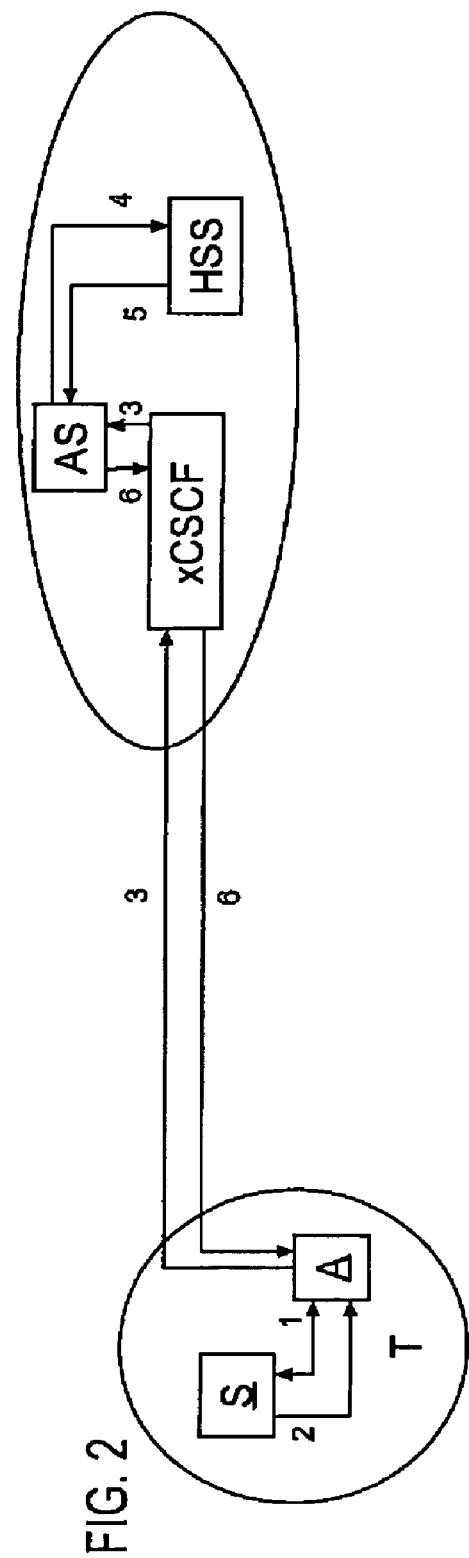
FIG. 2 shows an advantageous embodiment of setting up redirection according to the method of the invention.

The method according to the invention utilizes the IMS-network in redirecting calls. FIG. 2 presents a possible application target for redirecting calls. For simplification, the element xCSCF of FIG. 2 comprises all the above-mentioned CSCF elements (P-CSCF, I-CSCF, S-CSCF), because they function in the method according to the invention in a manner known as such and thus are not considered an inventive idea. A user in an airport T has a mobile communication device, a terminal A, which can set up a communication link with some other data network. The communication link can be a short-range data transmission connection, advantageously either Bluetooth or Infrared, but the usage of other data transmission connection is also possible. In addition, it is advantageous that the mobile phone is registered to the IMS.

The user activates Bluetooth, infrared, or similar from his/her mobile communication device A to set up a data transmission connection. As a result of the activation, the communication system S at the airport can detect said device and set up (1) a link connection with it. When Bluetooth is the data transmission channel, setting up the connection and identifying the device is based on an individual 48-bit device address, which each Bluetooth device has. Devices, which set up a data transmission connection with the host system can, in addition, be identified by a 3-bit active member address (AM_ADDR), which is provided by the host device of the network (in the airport example system S). The devices can be identified on the basis of this address.

In the airport example the system S starts a request on the devices within the coverage area (airport) or directly begins a contact with a device address known to it.

Via the set up contact, the system S receives the information on the personal data card of the mobile communication device A, which it compares to the travel information saved in the system S. On the basis of the received data the system S can form a proposal of new target addresses. The system S sends (2), by utilizing the data transmission connection, a message to the mobile communication device A, which is a proposal to set up redirection to one or more communication systems. In this example, the communication system is advantageously a satellite phone, which is situated in an airplane, outside the mobile communication network. The communication system can also be some other system outside the coverage area of the mobile communication network. In addition, the communication system can also be within the coverage area of the mobile communication network.

The report sent by the system S includes information on the flight number, departure and arrival airports, as well as the duration of the journey. The duration of the journey is determined to notify the person who wants to reach the passenger. On the basis of the information, the person who is setting up the connection receives information on the reachability of the passenger, which is especially useful when the passenger has disallowed the redirection of connections of the desired type. In addition to this, the addresses of the target communication systems (satellite phones) are determined in the report. Further, the proposal includes a possibility to select which contacts the user wishes to receive. The selection parameters used can include sound, picture, text, subject, caller, caller group, etc.

Figure 4:
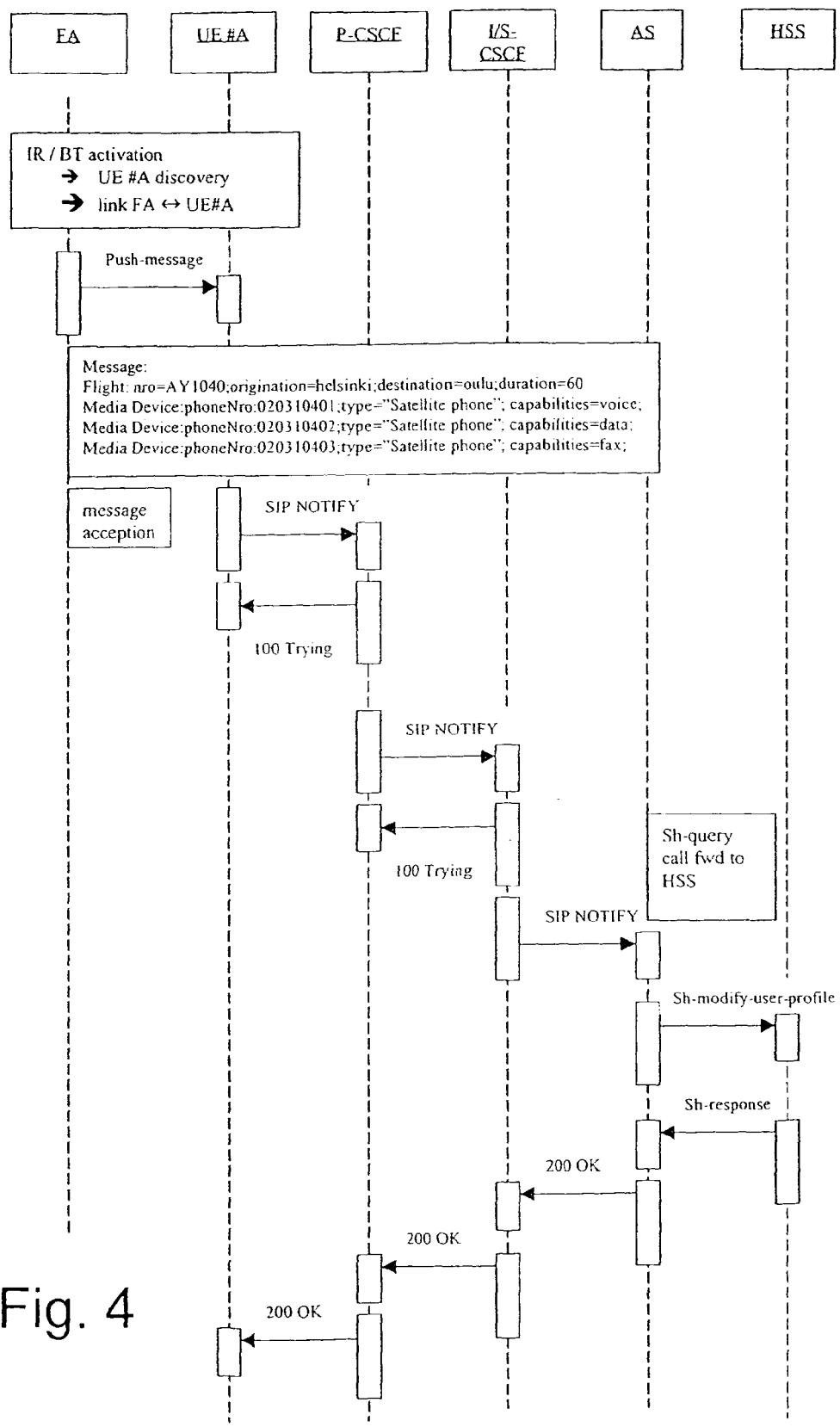
FIG. 4 presents setting up redirection of a contact performed with the method according to the invention as a sequence chart.

After receiving the proposal in his/her mobile communication device, the user either accepts the message as such, edits the transmission parameters before accepting or rejects the message. Acceptance is followed by sending (3) a SIP message (SIP-NOTIFY) to the home network H. The SIP-NOTIFY message is used to inform about changes or presence, in this case to set up call forwarding. Information on the targets of call forwarding and the conditions, as well as its implementation are transmitted to the element xCSCF in the home network H, and further to the application server AS, which updates (modify-user-profile) (4) the database HSS. The database HSS includes the subscription information and location information of the user. After the updating, a response (5) leaves from the database HSS to the application server AS. This transmits the SIP acknowledgement (200 OK) (6) via the element xCSCF to the mobile communication device A. The sequence chart of FIG. 4 presents the above-described function and the SIP messages that are used. In FIG. 4 the airport announcement FA, or some other message center functioning in the system, sends a proposal to the user device UE#A after the data transmission connection is set up between said devices. After message acceptance a SIP_NO-TIFY message leaves from the user device UE#A, which message includes information on the modifications being made. The message travels via the control functions of the server (P-CSCF, I/S-CSCF) to the application server AS, ordered by which the database HSS is updated with the modification.

Figure 3:
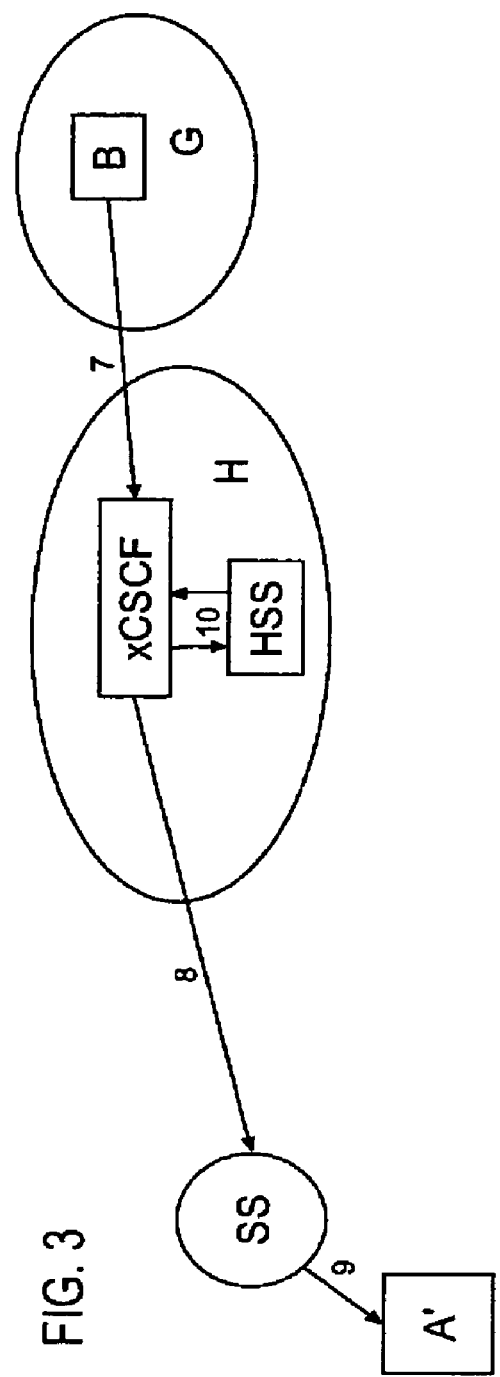
FIG. 3 presents the direction of a contact outside the coverage area.

FIG. 3 presents the redirection of a call to a communication system A', which is located outside the general mobile communication network. According to FIG. 2, the element xCSCF comprises the necessary CSCF elements (P-CSCF, I-CSCF, S-CSCF) for simplification. For the part of these elements, controlling a contact takes place in a known manner as such. When a contact is desired to be set up from communication device B to mobile communication device A, the request is directed (7) from the operation network of the communication device B to the element xCSCF of the home network H of the mobile communication device A, where the new location information of the holder of the mobile communication device A is updated. On the basis of the information the contact is directed (8,9) advantageously to a new address. In addition, it is possible to perform a request (10) to database HSS with the contact request, if necessary. If switching conditions are determined for the contacts coming to the mobile communication device A, control is performed according to them. Control (8) of the contact travels via the communication system SS, which advantageously is a satellite system, further (9) to a new target address A'.

Redirection can be stopped advantageously when the user switches his mobile communication device A on or, at the latest, after a set time, which can be a certain time forwards from the time the airplane has landed, determined by system S.

It will be obvious that the present invention is not limited solely to the above-presented embodiment, but it can be modified within the scope of the appended claims.

The invention claimed is:

1. A method for redirecting terminal communications, the method comprising:
   establishing a communication link with a terminal;
   receiving, through the established communication link, information identifying at least one of a user of the terminal or the terminal;
   identifying, based at least in part on the received information, second information regarding a period during which the terminal is to be off or without service;
   generating a proposal based at least in part on the second information, wherein the proposal comprises one or more call forward targets for receiving communications directed toward the terminal during the period;
   providing the proposal to the terminal; and
   receiving, from the terminal, an acceptance which designates at least one of the one or more call forward targets for receiving the communications directed toward the terminal during the period.

2. The method according to claim 1, wherein the at least one of the one or a more call forward targets is located outside a coverage area of the terminal.

3. The method according to claim 1, wherein the communication link comprises a short-range wireless data transmission connection.

4. The method according to claim 1, wherein the terminal comprises means for performing mobile communication.

5. The method according to claim 1, wherein the terminal function in an Internet Protocol based multimedia system (IMS).

6. The method according to claim 1, further comprising directing a communication inten ded for the terminal to the at least one of the one or more call forward targets during the period.

7. The method according to claim 6, wherein the communication is directed based at least in part on a parameter indicated in the acceptance, wherein the parameter comprises at least one of a presence of audio content in the communication, a presence of pictorial content in the communication, a subject of the communication, a caller on originating the communication, or a calling group on originating the communication.

8. The method according to the claim 1, wherein the second information comprises travel information regarding an airplane flight of the user of the terminal.

9. The method according to claim 1, further comprising automatically deactivating redirection to the at least one of the one or more call forward targets if the terminal is switched on or after a predetermined time.

10. A system which comprises:
 a communication system coupled to a terminal via a communication link, wherein the communication system is configured to
  receive, through the communication link, information identifying at least one of a user of the terminal or the terminal;
  identify, based at least in part on the received information, second information regarding a period during which the terminal is to be off or without service;
  generate a proposal based at least in part on the second information, wherein the proposal comprises one or more call forward targets for receiving communications directed toward the terminal during the period; and
  provide the proposal to the terminal; and
 a home network of the terminal, wherein the home network comprises
  a first network element configured to receive a message from the terminal, wherein the message comprises an identification of at least one of the one or more call forward targets;and
  a second network element configured to redirect a communication intended for the terminal to the least one of the one or more call forward targets during the period.

11. The system according to claim 10, wherein the at least one of the one or more call forward targets is located outside a coverage area of the home network of the terminal.

12. The system according to claim 10, wherein the at least one of the one or more call forward targets comprises a satellite phone.

13. The system according to claim 12, wherein the second information comprises travel information regarding a flight of the user of the terminal, and further wherein the satellite phone is located on an airplane.

14. The system according to claim 10, wherein the terminal is arranged to function in an Internet Protocol based multimedia system (IMS).

15. The system according to claim 10, wherein the second network element is further configured to automatically deactivate redirection to the at least one of the one or more call forward targets if the terminal is switched on.

* * * * *